No. 634,552. Patented Oct. 10, 1899.
A. A. DAY.
APPARATUS FOR PREPARING AND FEEDING FUEL.
(Application filed June 16, 1899.)
(No Model.) 2 Sheets—Sheet 1.
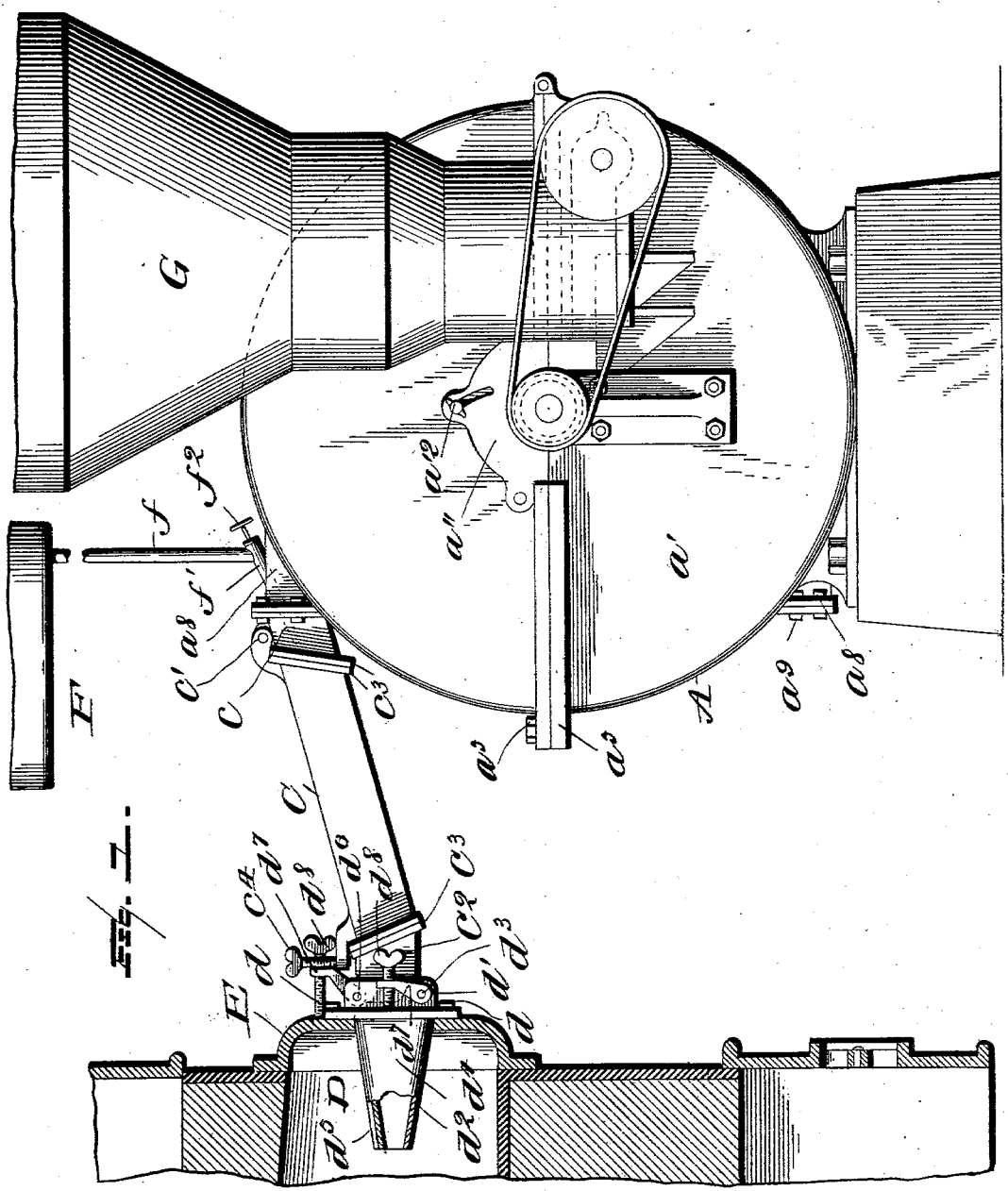
Witnesses
L. C. Hills
J. D. Kingsbury
Inventor
Albert A. Day
By Whitaker Prevost
Attorneys

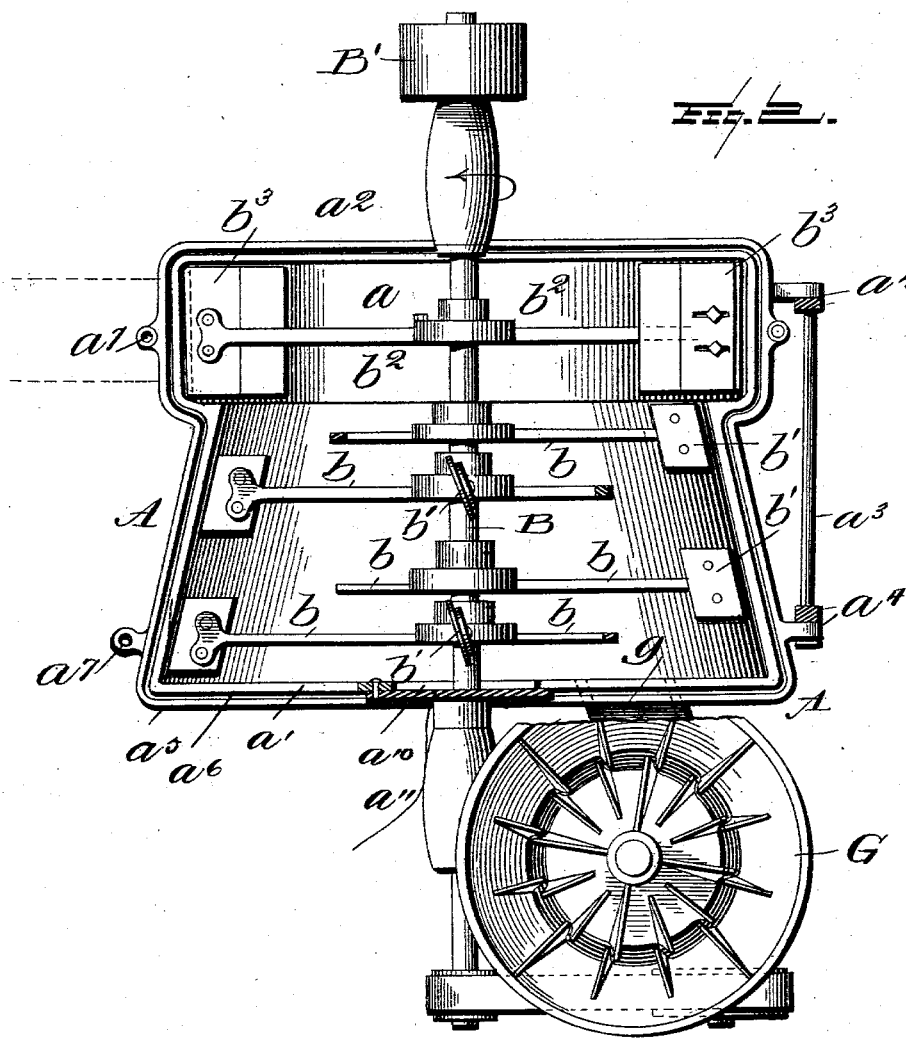

UNITED STATES PATENT OFFICE.

ALBERT A. DAY, OF NEW YORK, N. Y., ASSIGNOR TO THE IDEAL FUEL FEEDER COMPANY, OF HEMPSTEAD, NEW YORK.

APPARATUS FOR PREPARING AND FEEDING FUEL.

SPECIFICATION forming part of Letters Patent No. 634,552, dated October 10, 1899.

Application filed June 16, 1899. Serial No. 720,821. (No model.)

*To all whom it may concern:*

Be it known that I, ALBERT A. DAY, a citizen of the United States, residing at New York, (Brooklyn,) in the county of Kings and State of New York, have invented certain new and useful Improvements in Apparatus for Preparing and Feeding Fuel; and I do hereby declare the following to be a full, clear, and exact description of the invention, such as will enable others skilled in the art to which it appertains to make and use the same.

My invention is an improvement in apparatus for preparing and feeding fuel in finely-divided conditions to furnaces; and it consists in the novel features hereinafter described, reference being had to the accompanying drawings, which illustrate one form in which I have contemplated embodying my invention, and said invention is fully disclosed in the following description and claims.

Referring to the drawings, Figure 1 represents a side elevation of my improved apparatus applied to a boiler-furnace, a portion of which is illustrated in section. Fig. 2 is a plan view of the apparatus with the upper portion of the pulverizing-chamber removed, together with the parts connected thereto.

My invention relates particularly to the construction and operation of the pulverizing-chamber, in which the fuel is reduced to a pulverulent condition, and in devices for injecting a hydrocarbon fluid into the stream of air and powdered fuel before it reaches the nozzle of the apparatus.

In the drawings, A represents the casing of what I term the "pulverizing-chamber." The main portion of the casing is in the form of a truncated cone disposed in a horizontal position, the side walls of the casing tapering from the inlet end gradually toward the outlet end of the casing, where they expand abruptly to form an annular trough $a$. The ends $a'$ and $a^2$ of the casing are substantially vertical and are of circular shape. In order to facilitate the assembling of the parts and also to give access to the interior of the chamber when necessary, I form the casing A in two parts, dividing it on a horizontal plane passing through the center of the casing, as shown in Fig. 1, the said parts being connected along one edge by a hinge-bolt $a^3$, passing through lugs $a^4$, extending from the upper and lower halves of the casing, and the meeting edges of the casing are provided with horizontal flanges $a^5$, containing grooves $a^6$ to receive a suitable packing, so that the two parts will be tightly united when brought together. The two sections of the casing are held together on the side opposite the hinge-bolt $a^3$ by connecting-bolts passing through lugs $a^7$.
(See Fig. 2.)

B represents a horizontal shaft which passes centrally through the casing A and is provided within the conical portion of the casing with a series of arms $b$, carrying fan-blades or pulverizing-blades $b'$. These blades have their outer edges parallel to the conical wall of the casing, and said blades are set at an angle to the shaft B, as shown in Fig. 2, so that when the shaft is rotated in the direction indicated by the arrow in Fig. 2 the angular position of the fan-blades will cause them to convey the material with which they come in contact toward the wider or inlet end of the casing A, as will be readily seen by reference to Fig. 2. The shaft B is also provided with a series of radial arms $b^2$, carrying adjustable fan-blades $b^3$, traveling in the annular trough $a$ of the casing A. These adjustable blades $b^3$ are so constructed that their area can be increased or diminished to regulate the velocity of the blast which they produce.

The portion of the casing A containing the annular trough $a$ is provided adjacent to its top and bottom with a tangential outlet $a^8 a^8$.
The lower outlet is preferably closed by means of a plate $a^9$, as shown, and is only used in special cases where it is necessary to discharge material from the bottom of the casing. The upper outlet is connected with a chute extending to a nozzle which projects into the fire-box of the furnace. This chute is preferably made in the form of a rectangular metallic pipe, a stationary section $c$ of which is bolted or otherwise secured to the outlet $a^8$ on the upper part of the casing A, and to this stationary section a movable section C is connected by means of a hinge $c'$. The nozzle, which may be made as shown in the drawings or of any other preferred form, is indicated at D and extends through an aperture in the fire-door E, is secured thereto by means of bolts or screws, as indicated at $d$, and is provided with a short section $c^2$ of the rectangular pipe adapted to be connected to the movable end of the intermediate movable section C. The meeting edges of the intermediate section C and the stationary section $c\ c^2$ are preferably provided with laterally-extending flanges, as shown at $c^3\ c^3$, and packing may be inserted between such flanges, if found desirable. The movable section C is also provided with a set-screw $c^4$ to engage the section $c^2$ to prevent its accidental removal therefrom.

The nozzle D, which I have shown in this instance, comprises a casing $d'$, secured to the furnace-door E, and two pivoted plates, the lower plate $d^2$ being pivoted on a shaft $d^3$ and provided at its sides with vertically-extending webs or flanges $d^4$. The upper plate $d^5$ lies between the flanges $d^4$ of the lower plate and is pivoted on a shaft $d^6$. Each of the shafts $d^3$ and $d^6$ is provided with an arm $d^7$ and an adjusting-screw $d^8$, by means of which the two plates may be adjusted with respect to each other, so as to direct the stream of air and fuel passing through the nozzle, as desired.

F represents a tank or receptacle for containing a hydrocarbon liquid—such as crude petroleum, kerosene, or other hydrocarbon—located at a suitable distance from the apparatus and provided with a pipe $f$, leading to a discharge-nozzle $f'$, which preferably extends into the outlet-passage $a^8$ of the casing A, as shown in Fig. 1, and is provided with a regulating-valve $f^2$, by means of which the flow of the hydrocarbon can be accurately controlled.

The fuel to be reduced to a pulverized condition, which is ordinary soft coal, must be sufficiently broken up to be in the form of small particles before it is introduced into the pulverizing-chamber. To this end I provide a breaking and grinding mechanism, (illustrated at G, Figs. 1 and 2,) which may be of any ordinary or preferred construction for breaking up the coal as it comes from the mine and reducing it sufficiently to be properly acted upon in the pulverizing-chamber. I make no claim to this grinding and breaking apparatus, and the construction of it will not therefore be further described. The grinding and breaking mechanism G will be provided with a chute $g$, (see Fig. 2,) by which the material can be delivered into the casing A at the end of the conical portion thereof having the greatest diameter. The shaft B is provided with a driving-pulley B', by which it is driven at a very high rate of speed, and as the material in a crushed and broken condition is fed into the casing A it will be caught by the angular fan and driven to the periphery of the casing, where a layer as deep as the distance between the outer edges of the fan-blades or pulverizing-blades and the wall of the casing will always be maintained while the machine is in operation. The material will be carried around by the blades and will be caused to rub against the layer of material held against the walls of the casing, thereby causing the material to grind or pulverize itself by friction. The larger particles will fall from the upper side of the casing to the lower side and will be struck by the blades with considerable force, thus breaking and reducing them to fine particles. Owing to the fact that the casing A decreases in diameter gradually from the inlet end toward the annular trough $a$, the material will have a tendency to work backward toward the inlet end, and this tendency will also be assisted by the angular position of the pulverizing-blades, which will convey the material always rearwardly away from the trough $a$. The object of this construction is to prevent any of the larger particles of the material from working into the trough $a$ and being discharged before being thoroughly reduced to powder. The end $a'$ of the casing is provided with an air-inlet aperture $a^{10}$, closed by an adjustable sliding gate $a^{11}$, provided with a clamping screw or bolt $a^{12}$, and through this aperture air is admitted to the interior of the casing. This air will pass in a strong current through the central portion of the casing to the trough $a$, where it will be acted upon by the fan-blades $b^3$ and discharged through the chute and nozzle. The portions of the material which have been reduced to the form of powder will be caught up by this air-current and carried into the trough $a$ and discharged, while the larger portion will, as before stated, be retained in the casing and subjected to the pulverizing action therein until completely reduced.

It will thus be seen that the fan-blades $b^3$ $b^3$ will force a current of air laden with fuel in the form of dust or powder through the discharge-chute and nozzle D into the furnace, where it will be consumed, it being only necessary to kindle an initial fire to furnish a flame for the ignition of the first portions of the powdered fuel, after which the ignition and burning of the fuel will continue as long as the apparatus is in operation, producing an intense heat and a perfect combustion of the fuel, and thereby obviating the formation of smoke, the particles of the fuel being consumed while surrounded by the current of air.

After starting the apparatus the valve $f^2$ will be opened to allow the hydrocarbon liquid to be discharged into the stream of air and fuel passing through the chute to the nozzle. The hydrocarbon liquid will be instantly vaporized and will mix with the air and fuel and give an increased heat in the furnace and also will more perfectly sustain the flame, the continuation of which is necessary to the perfect operation of the apparatus.

By locating the hydrocarbon-discharge nozzle at the point indicated it will not interfere with the removal of the movable pipe-section C when it may be necessary to disconnect the nozzle from the apparatus for the purpose of gaining access to the furnace or for other reasons. It will be observed that this section C can be thrown up, thus disengaging it from the nozzle D and permitting the furnace-door to be opened, as usual.

What I claim, and desire to secure by Letters Patent, is—

1. In an apparatus for preparing and feeding fuel, the combination with a horizontal pulverizing-chamber circular in cross-section, tapering from one end to the other and provided at its narrower end with an annular trough provided with a tangential discharge-passage, of a series of revolving pulverizing-blades in the said pulverizing-chamber, arranged to travel close to the tapering wall thereof, a series of ejecting fan-blades in said annular trough, an inlet for the material to be operated on adjacent to the wider end of the pulverizing-chamber, and an air-inlet adjacent to the center of the larger end of said chamber, whereby a current of air will be caused to pass centrally through the pulverizing-chamber carrying with it the pulverized portions of the material and the passage of the larger particles of the material from the inlet end of said chamber toward the said trough will be retarded by said tapering walls, substantially as described.

2. In an apparatus for preparing and feeding fuel, the combination with a horizontal pulverizing-chamber circular in cross-section, tapering from one end to the other, and provided at its narrower end with an annular trough having a tangential discharge-passage, said chamber being provided at its larger end with a fuel-inlet, and an air-inlet adjacent to the center of the chamber, of a series of revolving pulverizing-blades in said casing turned at an angle to the longitudinal axis of the chamber having their outer edges closely adjacent to the wall of said chamber, whereby said blades will convey the particles of fuel operated on toward the inlet end of the chamber, and a series of rotary ejecting fan-blades in said trough, whereby a current of air will be caused to pass centrally through said chamber carrying with it the pulverized portions of the fuel and the passage of the larger particles from the inlet end of the casing toward the trough will be retarded by the tapering walls of said chamber and the inclined pulverizing-blades, substantially as described.

3. In an apparatus for preparing and feeding fuel, the combination with a pulverizing-chamber of conical form provided with an annular trough adjacent to its narrower end, said trough having a tangential discharge, said chamber having a fuel-inlet at its wider end and an air-inlet adjacent to the center of its wider end, of a series of revoluble pulverizing-blades within the conical portion of said chamber, a series of fan-blades within said trough for forcing a current of air laden with finely-divided fuel through said discharge, whereby a current of air will be caused to pass centrally through the pulverizing-chamber carrying with it the pulverized portions of the fuel to the fan-blades in said trough, and the larger particles of fuel will be restrained from passing to said trough by the tapering wall of said chamber, and a discharge-nozzle for hydrocarbon liquid adapted to discharge said liquid into the current of air and fuel, substantially as described.

4. In an apparatus for preparing and feeding fuel, the combination with the casing containing a conical pulverizing-chamber and an annular trough adjacent to the narrow end of said pulverizing-chamber, said trough being provided with a tangential discharge and said pulverizing-chamber being provided with a fuel-inlet and an air-inlet at its wider end, of a series of revoluble pulverizing-blades within said pulverizing-chamber, a series of fan-blades within said trough, a discharge-nozzle for liquid hydrocarbon extending into the tangential discharge from said trough, a nozzle for delivering the air laden with fuel to a furnace and a detachable section or tube connecting said tangential discharge and said nozzle whereby said detachable section may be disconnected from the nozzle without disturbing the tangential discharge of said trough or the hydrocarbon-nozzle, substantially as described.

In testimony whereof I affix my signature in the presence of two witnesses.

ALBERT A. DAY.

Witnesses:
JOHN A. NEXSEN,
CAROLINE A. NEXSEN.